United States Patent
Nance et al.

(10) Patent No.: US 6,766,991 B1
(45) Date of Patent: Jul. 27, 2004

(54) DRY SUMP PUMP BRACKET

(76) Inventors: Derek Nance, 2649 Ranchero La., Merced, CA (US) 95340; Michelle Nance, 2649 Ranchero La., Merced, CA (US) 95340

( * ) Notice: Subject to any disclaimer, the term of this patent is extended or adjusted under 35 U.S.C. 154(b) by 86 days.

(21) Appl. No.: 10/142,458

(22) Filed: May 10, 2002

(51) Int. Cl.[7] ............................. E04G 5/06; F16M 1/00
(52) U.S. Cl. ....................................... 248/215; 248/674
(58) Field of Search ................................ 248/215, 674, 248/200, 300, 351

(56) References Cited

U.S. PATENT DOCUMENTS

| | | | | |
|---|---|---|---|---|
| 1,635,847 A | * | 7/1927 | Hooper | 248/675 |
| 2,662,988 A | * | 12/1953 | McKim | 310/91 |
| 2,810,536 A | * | 10/1957 | Cunningham | 248/671 |
| 3,981,376 A | | 9/1976 | Kluge | |
| 4,097,012 A | * | 6/1978 | McIntyre | 248/674 |
| D257,665 S | * | 12/1980 | Young | D8/367 |
| D276,410 S | * | 11/1984 | Taylor | D8/380 |
| 4,492,357 A | * | 1/1985 | Morrill | 248/674 |
| D288,280 S | | 2/1987 | Schnable | |
| 4,790,204 A | | 12/1988 | Tury et al. | |
| 4,842,010 A | | 6/1989 | Edgecomb | |
| D311,859 S | * | 11/1990 | Bohringer | D8/380 |
| 5,174,539 A | * | 12/1992 | Leonard | 248/558 |
| 5,464,187 A | * | 11/1995 | Linkner, Jr. | 248/635 |
| 5,826,845 A | * | 10/1998 | Lounsbury et al. | 248/224.61 |
| 5,906,347 A | | 5/1999 | Noland | |
| 6,085,615 A | | 7/2000 | Kirkendall | |
| 6,230,585 B1 | * | 5/2001 | Bator | 248/674 |
| 6,270,051 B1 | * | 8/2001 | Power | 248/638 |

* cited by examiner

Primary Examiner—Anita M. King

(57) ABSTRACT

A dry sump pump bracket for providing a user with a transmission mountable bracket for a sump oiling pump on a race car. The dry sump pump bracket includes a main portion for providing base support to the sump pump. A mounting portion is for mounting the main portion to a transmission of a vehicle. A bracket portion extends from the main portion. The bracket portion is for supporting the sump pump.

11 Claims, 2 Drawing Sheets

DRY SUMP PUMP BRACKET

BACKGROUND OF THE INVENTION

1. Field of the Invention

The present invention relates to brackets and more particularly pertains to a new dry sump pump bracket for providing a user with a transmission mountable bracket for a sump oiling pump on a race car.

2. Description of the Prior Art

The use of brackets is known in the prior art. U.S. Pat. No. 6,085,615 describes a bracket for solenoids on vehicle transmissions. Another type of bracket is U.S. Pat. No. 4,482,010 describing a locking mechanism for demountably securing a solenoid valve within a receptacle in the wall of a transmission. U.S. Pat. No. Des. 288,280 describes an ornamental design for a transmission adaptor bracket. U.S. Pat. No. 5,906,347 describes a drive shaft containment bracket adapted for attachment to a stationary vehicle support surface. U.S. Pat. No. 3,981,376 describes a vehicle protection means having a drive shaft and a u joint positioned adjacent to the transmission housing. U.S. Pat. No. 4,790,204 describes an electric shift apparatus.

SUMMARY OF THE INVENTION

The object of the present invention is to provide a new dry sump pump bracket that would provide an affordable system for the low budget racing team.

Another object of the present invention is to provide a new dry sump pump bracket that would enable the same oiling advantage and performance achieved without the high cost.

To this end, the present invention generally comprises a main portion for providing base support to the sump pump. A mounting portion is for mounting the main portion to a transmission of a vehicle. A bracket portion extends from the main portion. The bracket portion is for supporting the sump pump.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
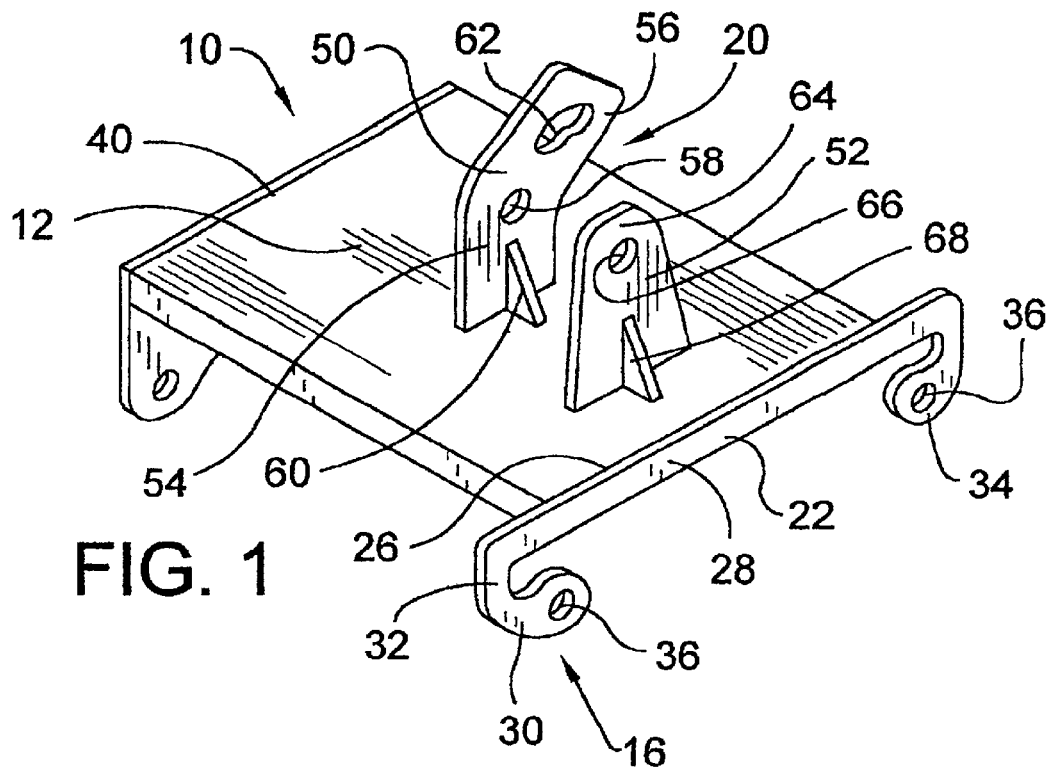
FIG. 1 is a perspective view of a new dry sump pump bracket according to the present invention.
Figure 2:
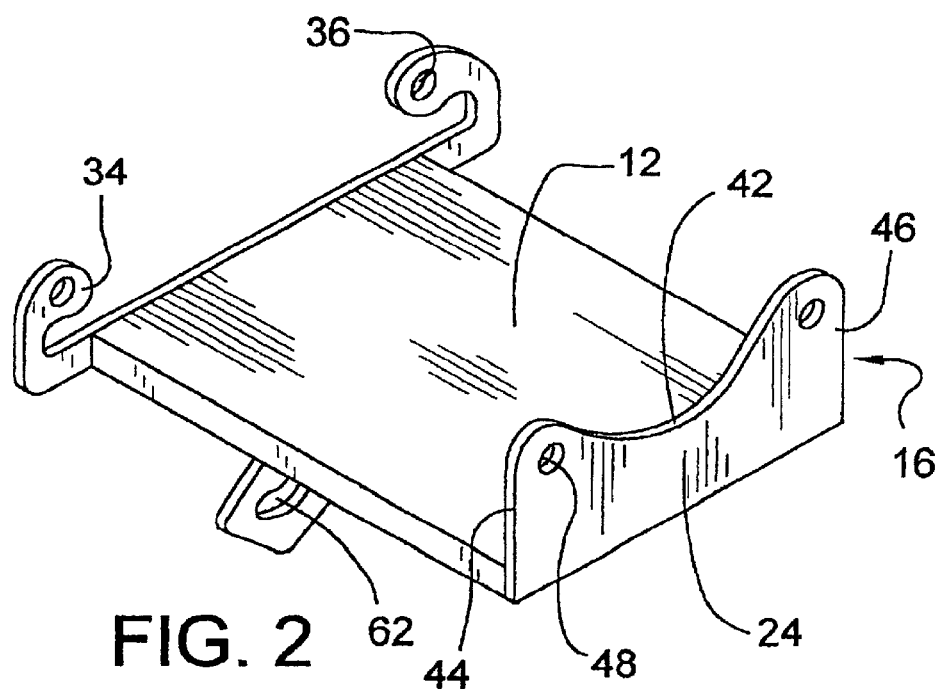
FIG. 2 is a perspective view of the present invention.
Figure 3:
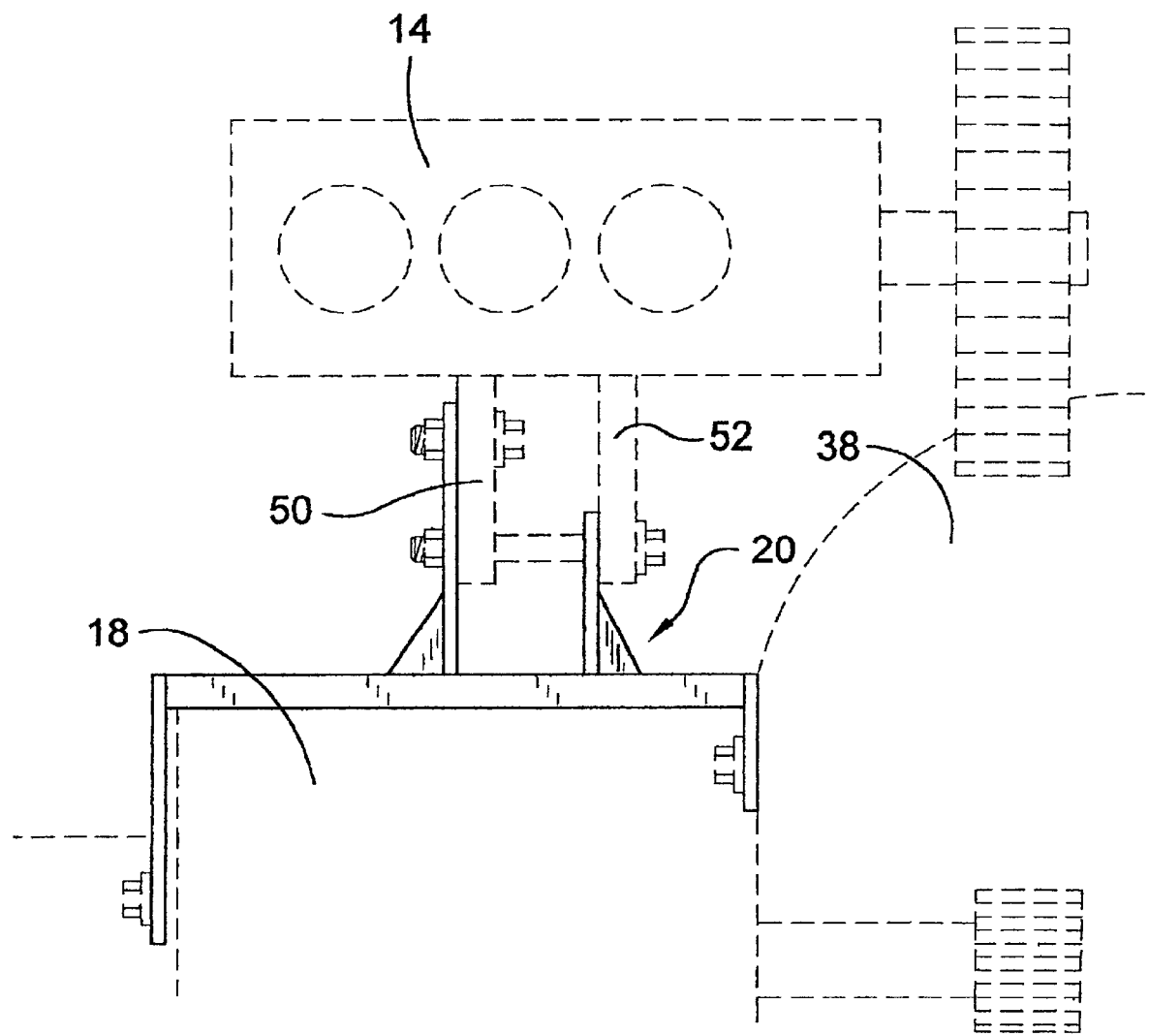
FIG. 3 is an in-use view of the present invention.

With reference now to the drawings, and in particular to FIGS. 1 through 3 thereof, a new dry sump pump bracket embodying the principles and concepts of the present invention and generally designated by the reference numeral 10 will be described.

As best illustrated in FIGS. 1 through 3, the dry sump pump bracket generally comprises a main portion 12 for providing base support to the sump pump 14. A mounting portion 16 is for mounting the main portion 12 to a transmission 18 of a vehicle. A bracket portion 20 extends from the main portion 12. The bracket portion 20 is for supporting the sump pump 14.

The mounting portion 16 includes a first mounting member 22 and a second mounting member 24 coupled to the main portion 12. The first mounting member 22 is designed for coupling the main portion 12 to a transmission 18 of a vehicle.

The first mounting member 22 is coupled to a first end 26 of the main portion 12. The first mounting member 22 has an elongate portion 28 and a plurality of tab portions 30. The tab portions 30 are positioned at opposing ends of the elongate portion 28. The tab portions 30 have a first extent 32 extending perpendicularly from the elongate portion 28. The tab portion 30 has a generally arcuate second extent 34 that is in a spaced substantially parallel relationship with the elongate portion 28. Each of the tab portions 30 has an aperture 36 for facilitating mounting of the first mounting member 22 to a bell housing portion 38 of the transmission 18.

The second mounting member 24 is coupled to a second end 40 of the main portion 12 having an arcuate cutout portion 42 extending form a first side wall 44 to a second side wall 46 of the second mounting member 24. The arcuate cutout portion 42 is for receiving a portion of the transmission 18. The second mounting member 24 has a plurality of holes 48 for facilitating mounting of the second mounting member 24 to a portion of the transmission 18 distal from the bell housing 38 of the transmission 18.

The bracket portion 20 includes a first bracket member 50 and the second bracket member 52. The first bracket member 50 and the second bracket member 52 are for coupling the sump pump 14 to the main portion 12.

The first bracket member 50 has a mounting portion 54 and an adjustment portion 56. The mounting portion 54 has a first aperture 58 for facilitating coupling the sump pump 14 to the first bracket member 50. The mounting portion 54 has a first triangular support member 60 for providing additional strength to the first bracket member 50. The adjustment portion 56 extends from the mounting portion 16. The adjustment portion 56 has an elongated aperture 62 for facilitating adjustment of the sump pump 14 in relation to the main portion 12.

The second bracket member 52 has a mounting tab 64. The mounting tab 64 has a second aperture 66 for facilitating coupling to the sump pump 14 to the second bracket member 52. The second bracket member 52 has a second triangular support member 68 for providing additional strength to the second bracket member 52.

The assembly has an overall length of approximately 9 inches, an overall width of approximately 6 inches, and a height of approximately 3 inches.

In use, a user would couple the present invention to a transmission of a vehicle utilizing conventional fasteners. The sump pump would then be mounted to the first and second bracket members.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A bracket assembly for mounting onto a transmission of a vehicle for supporting a sump pump, comprising:
   a main portion for providing base support to the sump pump;
   a mounting portion for mounting said main portion to the transmission of the vehicle;
   a bracket portion extending from said main portion, said bracket portion being for supporting the sump pump;
   wherein said mounting portion comprising a first mounting member and a second mounting member being coupled to said main portion, said first mounting member being adapted for coupling said main portion to the transmission of the vehicle; and
   wherein said first mounting member being coupled to a first end of said main portion, said first mounting member having an elongate portion and a plurality of tab portions, said tab portions being positioned at opposing ends of said elongate portion, said tab portions having a first extent extending perpendicularly from said elongate portion, said tab portion having a generally arcuate second extent being in a spaced substantially parallel relationship with said elongate portion, each of said tab portions having an aperture for facilitating mounting of said first mounting member to a bell housing portion of the transmission.

2. The assembly of claim 1, wherein said second mounting member being coupled to a second end of said main portion having an arcuate cutout portion extending form a first side wall to a second side wall of said second mounting member, said arcuate cutout portion being for receiving a portion of the transmission, said second mounting member having a plurality of holes for facilitating mounting of said second mounting member to a portion of the transmission distal from the bell housing of the transmission.

3. The assembly of claim 1, wherein said bracket portion comprising a first bracket member and a second bracket member, said first bracket member and said second bracket member being for coupling said sump pump to said main portion.

4. The assembly of claim 3, wherein said first bracket member having a mounting portion and an adjustment portion; said mounting portion having a first aperture for facilitating coupling said sump pump to said first bracket portion; said mounting portion having a first triangular support member for providing additional strength to said first bracket member; said adjustment portion extends from said mounting portion, said adjustment portion has an elongated aperture for facilitating adjustment of said sump pump in relation to said main portion.

5. The assembly of claim 3, wherein said second bracket member has a mounting tab; said mounting tab having a second aperture for facilitating coupling to said sump pump to said second bracket portion; said second bracket portion having a second triangular support member for providing additional strength to said second bracket member.

6. The assembly of claim 1, wherein said bracket portion comprising a first bracket member and a second bracket member, said first bracket member and said second bracket member being for coupling said sump pump to said main portion;
   wherein said first bracket member having a mounting portion and an adjustment portion; said mounting portion having a first aperture for facilitating coupling said sump pump to said first bracket portion; said mounting portion having a first triangular support member for providing additional strength to said first bracket member; said adjustment portion extends from said mounting portion, said adjustment portion has an elongated aperture for facilitating adjustment of said sump pump in relation to said main portion; and
   wherein said second bracket member has a mounting tab; said mounting tab having a second aperture for facilitating coupling to said sump pump to said second bracket portion; said second bracket portion having a second triangular support member for providing additional strength to said second bracket members.

7. The assembly of claim 1, wherein said assembly having an overall length of approximately 9 inches, an overall width of approximately 6 inches, and a height of approximately 3 inches.

8. The assembly of claim 1, further comprising:
   wherein said second mounting member being coupled to a second end of said main portion having an arcuate cutout portion extending form a first side wall to a second side wall of said second mounting member, said arcuate cutout portion being for receiving a portion of the transmission, said second mounting member having a plurality of holes for facilitating mounting of said second mounting member to a portion of the transmission distal from the bell housing of the transmission;
   wherein said bracket portion further comprises a first bracket member and a second bracket member, said first bracket member and said second bracket member being for coupling said sump pump to said main portion;
   wherein said first bracket member having a mounting portion and an adjustment portion; said mounting portion having a first aperture for facilitating coupling said sump pump to said first bracket portion; said mounting portion having a first triangular support member for providing additional strength to said first bracket member; said adjustment portion extends from said mounting portion, said adjustment portion has an elongated aperture for facilitating adjustment of said sump pump in relation to said main portion;
   wherein said second bracket member has a mounting tab; said mounting tab having a second aperture for facilitating coupling to said sump pump to said second bracket portion; said second bracket portion having a second triangular support member for providing additional strength to said second bracket member; and
   wherein said assembly having an overall length of approximately 9 inches, an overall width of approximately 6 inches, and a height of approximately 3 inches.

9. A bracket assembly for mounting onto a transmission of a vehicle for supporting a sump pump, comprising:
   a main portion for providing base support to the sump pump;

a mounting portion for mounting said main portion to the transmission of the vehicle;

a bracket portion extending from said main portion, said bracket portion being for supporting the sump pump;

wherein said mounting portion comprising a first mounting member and a second mounting member being coupled to said main portion, said first mounting member being adapted for coupling said main portion to the transmission of the vehicle; and wherein said second mounting member being coupled to a second end of said main portion having an arcuate cutout portion extending form a first side wall to a second side wall of said second mounting member, said arcuate cutout portion being for receiving a portion of the transmission, said second mounting member having a plurality of holes for facilitating mounting of said second mounting member to a portion of the transmission distal from the bell housing of the transmission.

10. A bracket assembly for mounting onto a transmission of a vehicle for supporting a sump pump, comprising:

a main portion for providing base support to the sump pump;

a mounting portion for mounting said main portion to the transmission of the vehicle;

a bracket portion extending from said main portion, said bracket portion being for supporting the sump pump;

wherein said bracket portion comprising a first bracket member and a second bracket member, said first bracket member and said second bracket member being for coupling said sump pump to said main portion; and wherein said first bracket member having a mounting portion and an adjustment portion; said mounting portion having a first aperture for facilitating coupling said sump pump to said first bracket portion; said mounting portion having a first triangular support member for providing additional strength to said first bracket member; said adjustment portion extends from said mounting portion, said adjustment portion has an elongated aperture for facilitating adjustment of said sump pump in relation to said main portion.

11. A bracket assembly for mounting onto a transmission of a vehicle for supporting a sump pump, comprising:

a main portion for providing base support to the sump pump;

a mounting portion for mounting said main portion to the transmission of the vehicle;

a bracket portion extending from said main portion, said bracket portion being for supporting the sump pump;

wherein said bracket portion comprising a first bracket member and a second bracket member, said first bracket member and said second bracket member being for coupling said sump pump to said main portion; and wherein said second bracket member has a mounting tab; said mounting tab having a second aperture for facilitating coupling to said sump pump to said second bracket portion; said second bracket portion having a second triangular support member for providing additional strength to said second bracket member.

* * * * *